March 8, 1927.

N. HOSHAFIAN

WAVE AND TIDE MOTOR

Filed May 2, 1924

INVENTOR
NISHAN HOSHAFIAN
BY
Raeph E. Slayton
ATTORNEY

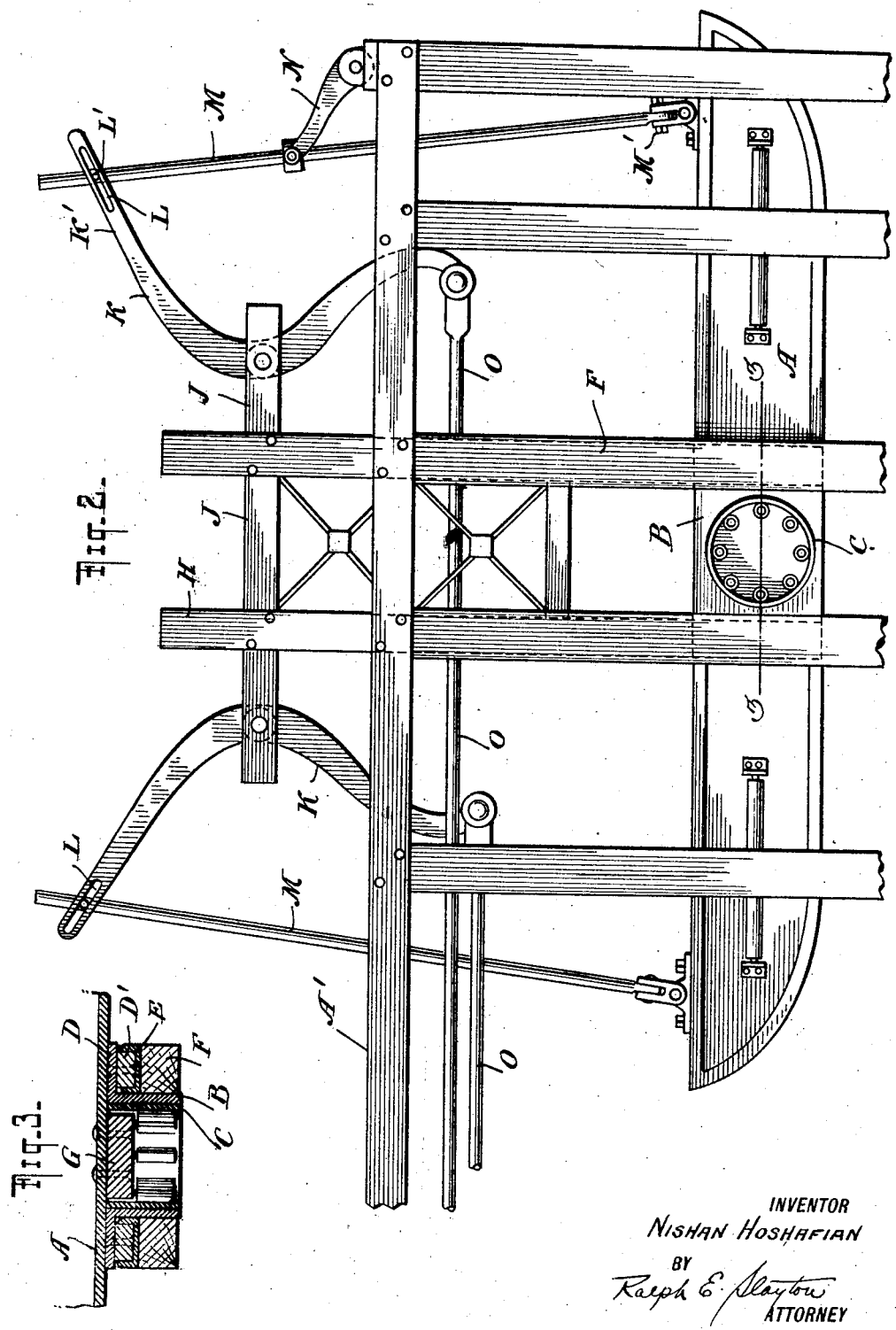

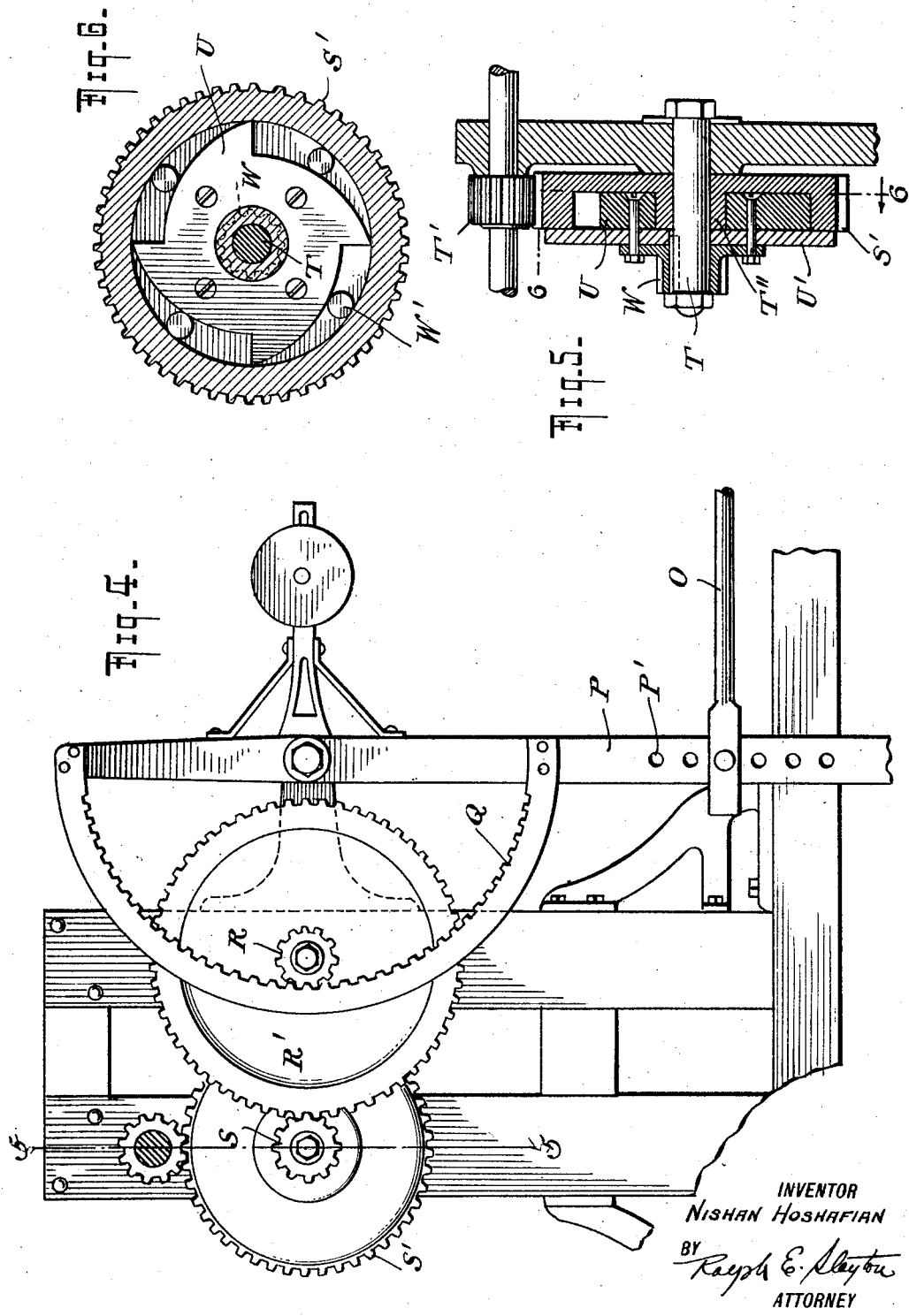

Patented Mar. 8, 1927.

1,620,258

UNITED STATES PATENT OFFICE.

NISHAN HOSHAFIAN, OF FOREST HILLS, NEW YORK.

WAVE AND TIDE MOTOR.

Application filed May 2, 1924. Serial No. 710,638.

This invention relates to devices for utilizing the surface motion of bodies of water and has more special reference to a device for converting the tide and wave motion into mechanical or electrical energy.

One phase of the present invention comprehends a water unit, a portion of which is held stationary to the water bed and having a buoyant element which moves relatively thereto, the relative motion of the element being utilized for conversion into a more conveniently handled form of energy.

Another aspect of the present invention comprehends a land unit located within convenient distance of a body of water which is subject to natural disturbance by the elements and a water unit connected to the land unit in such a way that the motion of the water unit is transferred to the land unit and converted into suitable energy for transmission to points remote from the device.

In its more specific aspect one phase of the invention comprehends a water unit comprising a pontoon or float which is kept in motion by the action of the waves and tides and carried in suitable guides while the land unit comprehends suitable gears connected to the pontoon and suitable mechanism for utilizing the motion imparted to the gears. This latter mechanism preferably takes the form of a dynamo and storage batteries, the storage batteries serving to store up the electrical energy created by the rather irregular action of the dynamo.

While several embodiments of the invention is illustrated in the accompanying drawings, it is to be understood that these embodiments merely serve as illustration of the principles of the invention so that they may be readily comprehended by those killed in the art and is not intended as imiting the invention to the specific forms disclosed.

In said drawings:

Fig. 2 is an enlarged detail view of some of the elements shown in Fig. 1.
Fig. 3 is a section of Fig. 2 on the line 3—3.

Fig. 4 is an enlarged detail view of some of the elements.

Fig. 5 is a fragmentary section of Fig. 4 on the line 5—5.

Fig. 6 is a section of Fig. 5 on the line 6—6.

Figure 1:
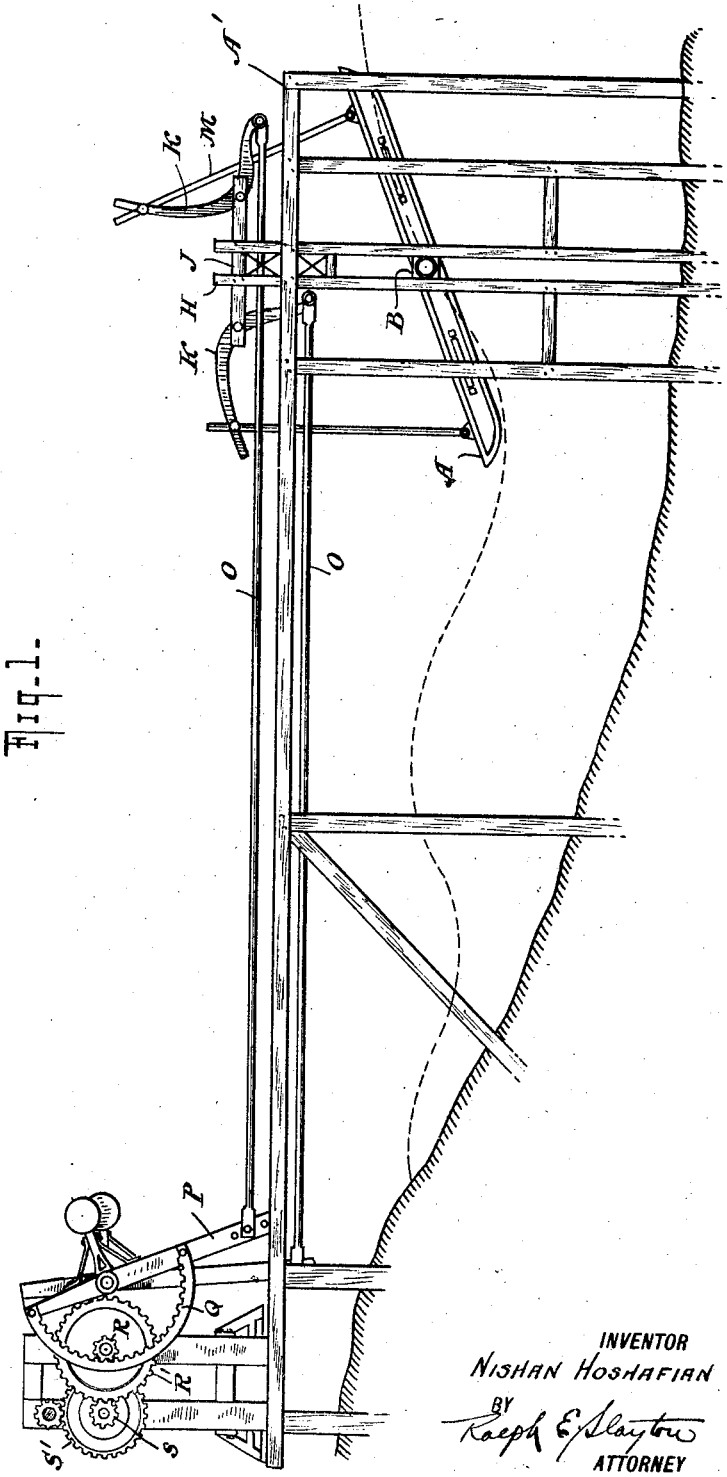
Fig. 1 is a side elevation of one form of the invention.

Continuing now by way of a more detailed description and referring more specially to Figs. 1 to 6, a float or pontoon A of suitable dimensions is arranged to float on the body of water, the surface motion of which it is desired to utilize. In order to utilize both the wave and tide motion the pontoon A is supported in a suitable frame work or water unit A', in such a way that the pontoon may rise vertically and may also rotate about a horizontal axis, the vertical motion affording a means to utilize the rise and fall of the tides and the rotational movement affording means to utilize the wave motion. This effect is achieved in general by swivelling the pontoon in oppositely disposed vertically flanged blocks B sliding in the frame work A'.

The construction of these swivelled connections is shown in Figs. 2 and 3, the sliding block B having an annular opening lined with a cylindrical sleeve C to afford a smooth bearing. The block B is flared to provide a flange D to which there is bolted a spacing block D' having a protective edging strip or shoe E, preferably in the form of a channel iron. These channel or edging irons preferably extend the length of one side of the block or plate B and slide against a pair of vertical spaced posts F as does a portion of the side of the block B as will be apparent from an inspection of Fig. 3, the block B being positively guided by posts F. In order to provide for the swivelled connection between the pontoon A and blocks B, a roller bearing carrier plate G is secured to the pontoon and has a plurality of annularly arranged roller bearings G' mounted on suitable spindles which in turn roll in the sleeve or facing plate C carried by the block B. The lower end of the posts or spiles F carrying the block B are firmly embedded in the bed of the river, lake or the like and are connected by suitable cross braces in order that the structure may withstand the action of the elements. The manner of supporting the spiles is within the province of an engineer and forms no part of the present invention. The spiles or posts G which carry the sliding plate B are carried upwardly to form extension pieces H which in turn carry a cross arm J, the ends of which extend outwardly a sufficient distance to afford a support for arcuate connecting arms or links K. These arms are arced or bowed in such a manner that upward movement of one leg causes a horizontal movement of the other leg. The upper leg K' is slotted at L to provide a slotted guideway for a pin L' projecting from an upstanding connecting rod M, the lower end of which is pivotally connected to one end of the pontoon A by a shackle bolt M'. Preferably the rod M is guided by a swinging bracket N pivoted to the frame although this guide is not absolutely essential since the pontoon is ordinarily adequately guided in the uprights F. The opposite end of the pontoon is likewise connected by a similar connecting rod so that when the pontoon is swinging about its axis or swivelled connection, the rods M have an alternate vertical motion, although in the event the pontoon rises vertically the legs K' may both rise simultaneously as will be readily understood. In order to convert the up and down motion of the lever arms K into a relatively horizontal motion for transmission to the shore or land end of the device, one end of the horizontal connecting links O are pinned to the lower ends of arms K while the opposite ends are pinned to a pivoted arm P. In order to afford means for adjusting the linkage between the pontoon and arm P so that the operating range of the device may be altered to existing weather or tide conditions, the link O is adapted to be attached to different points on the arm P so that the leveage of the arm may be changed. In the specific embodiment of the device illustrated, a plurality of pin openings P' are provided so that extracting the pin and shifting it to a different position the range of the device is altered. A segmental internal gear Q is attached to the end of arm P concentric with the pivotal point of the arm and is in engagement with a pinion R secured to gear R'. The gear R' in turn engages pinion S secured to gear S'. The gear train beginning with the pinion R and ending with the gear S' affords an increase in speed although at a sacrifice of power as will be readily understood. In general it is proposed to utilize some form of mechanism for transmitting the power to points remote from the device and for this purpose it is contemplated utilizing some form of electro energy (dynamo) as being convenient and hence speed is more essential than power. The invention is, however, in nowise limited to the particular type of mechanism which utilizes the energy of the device. In the event that a dynamo is used a unidirectional motion is desirable and to this end the construction shown more especially in Figs. 5 and 6 is utilized. The gear S' is freely mounted on shaft T and meshes with the pinion T' from which the rotational motion is taken for ultimate utilization. The gear S' has an annular groove which leaves a bushing or spindle T'' on which ratchet U is rotatably mounted. This ratchet is bolted to a facing plate U' which is adapted to move relatively to the gear S' and the bolts which clamp the ratchet V to the facing plate also bolt a hub W to the plate and ratchet. A plurality of disks or balls W' are interposed between the ratchet wings and the inner periphery of the gear S', the balls locking the ratchet to the gear when the ratchet is rotated in one direction and permitting the ratchet to rotate freely with respect to the gear S' when rotated in the opposite direction.

It is claimed:

1. Means for guiding a buoyant element in wave and tide motors of the character described, comprising a vertical guideway, a plate slidable in said guideway, having an annular opening and means comprising roller bearings carried by the buoyant element and engaging the annular opening to pivot the buoyant element in the plate.

2. A wave and tide motor of the character described combining a land unit and a water unit, the water unit comprising a stationary frame work secured to the water bed and supporting a movable pontoon, vertical spaced members forming a guideway, a movable block slidably carried in the guideway and having an opening, a plurality of roller bearings carried by the pontoon and adapted to roll in the opening to swivel the pontoon with respect to the frame work, and connecting means between the pontoon and the mechanism on the land unit to actuate the mechanism by the tide and wave motion.

3. A wave and tide motor of the character described combining a land unit and a water unit, the water unit comprising spiles secured to the water bed, a vertical guideway, a block vertically slidable in the guideway, having an annular opening, a pontoon and a plurality of roller bearings secured to the pontoon and arranged to roll in the opening.

4. A wave and tide motor of the character described combining a land unit and a water unit, the water unit comprising a frame work secured to the water bed, a vertical guideway formed in the frame work, a bearing plate having a flange carried in the guideway and having an annular opening, a facing plate in the opening, a pontoon, a plurality of roller bearings annularly arranged and secured to the pontoon and engaging the opening, the land unit comprising mechanism to receive the energy and means connecting the pontoon and said mechanism to translate the motion of the pontoon to the mechanism.

5. Means for guiding a buoyant element in wave and tide motors of the character described, comprising a buoyant element, a guideway, a plate slidable in said guideway, having an opening to pivot the buoyant element in the plate.

Signed at the city of New York in the county of New York, and State of New York, this 29th day of March 1924.

NISHAN HOSHAFIAN.